Figure 1:
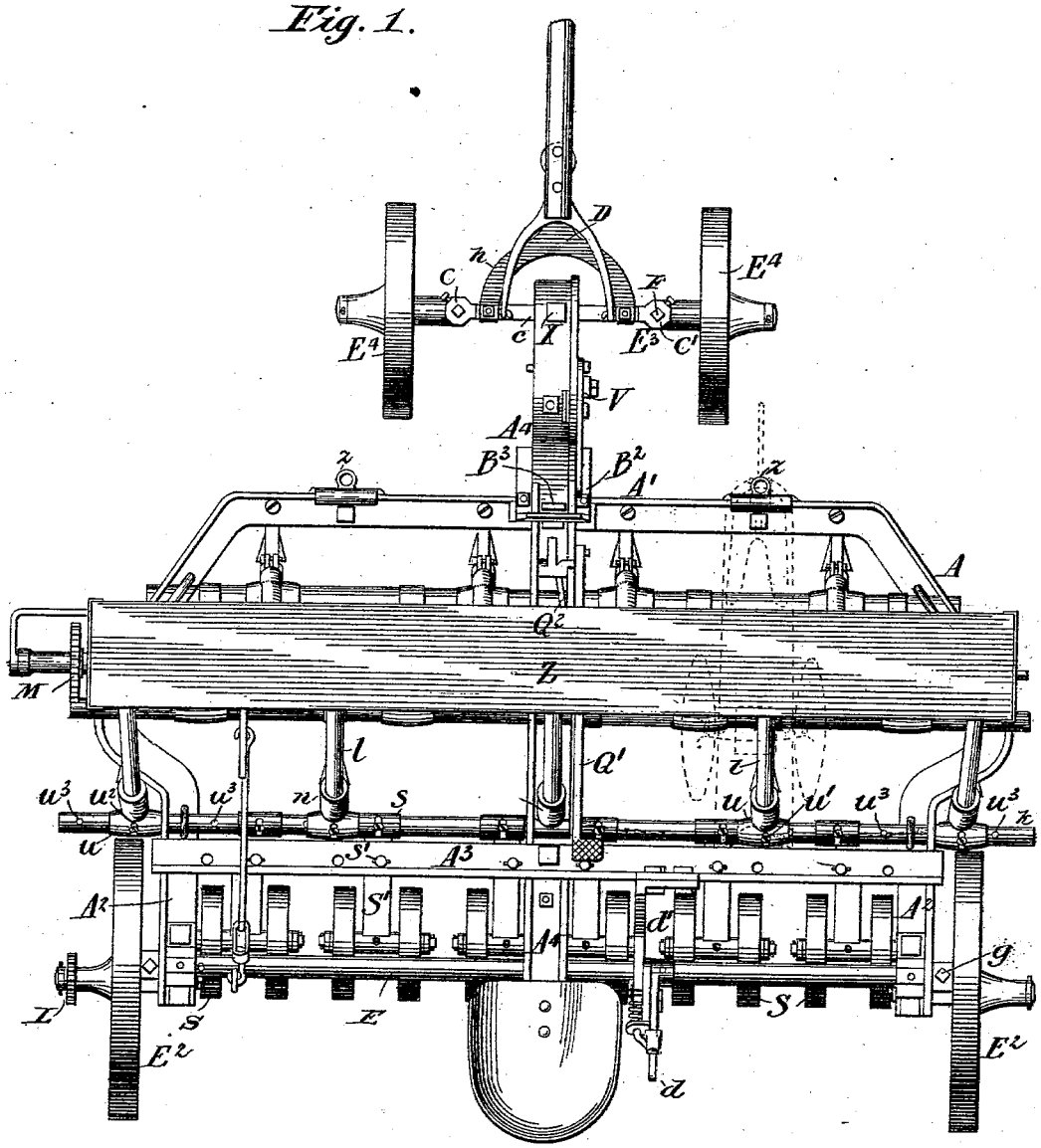

No. 716,764. Patented Dec. 23, 1902.
L. SACK.
COMBINATION DRILL.
(Application filed Apr. 21, 1902.)

(No Model.) 2 Sheets—Sheet 1.

Witnesses:
Frank J. Taylor
Joseph Sack

Inventor:
Lawrence Sack

No. 716,764. Patented Dec. 23, 1902.
L. SACK.
COMBINATION DRILL.
(Application filed Apr. 21, 1902.)
(No Model.) 2 Sheets—Sheet 2.
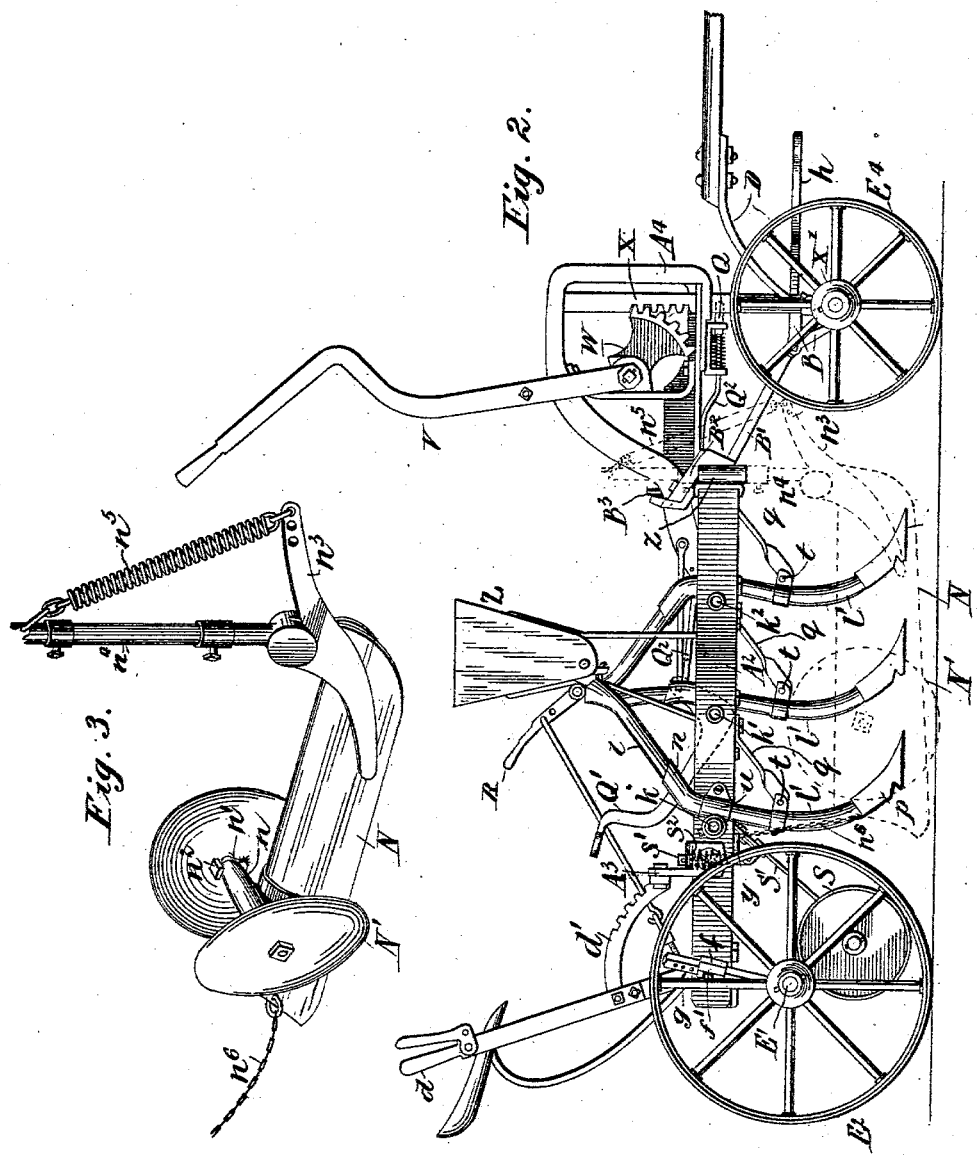
Witnesses:
Frank J. Taylor.
Joseph Sack.
Inventor:
Lawrence Sack

UNITED STATES PATENT OFFICE.

LAWRENCE SACK, OF FARWELL, NEBRASKA.

COMBINATION-DRILL.

SPECIFICATION forming part of Letters Patent No. 716,764, dated December 23, 1902.

Application filed April 21, 1902. Serial No. 104,087. (No model.)

*To all whom it may concern:*

Be it known that I, LAWRENCE SACK, a citizen of the United States, and a resident of Farwell, in the county of Howard, State of Nebraska, have invented certain new and useful Improvements in Combination Grain-Drills, of which the following is a specification.

My invention, which relates to grain-drills, has for its object the production of a machine of this character which is adapted to be used alternately as a drill, as a cultivator for listed corn, and as a pulverizer.

The nature of the invention will be readily comprehended, reference being had to the following description of the construction and operation and resultant advantages and to the accompanying drawings, in which the invention is illustrated in its preferred form, it being understood that various changes and modifications may be made therein without departing from the spirit of the invention as defined by the claims.

In the drawings, Figure 1 is a plan view of a machine embodying my invention. Fig. 2 is a side elevation. Fig. 3 is a detail perspective view of a lister attachment.

Referring to the drawings by letters, A denotes the frame of the machine, consisting of a front bar A' and rearwardly-extending side bars $A^2 A^2$, the latter being connected together toward their ends by a cross-bar $A^3$. Centrally and longitudinally of the frame is a reach-bar $A^4$, on the rear end of which is supported the operator's seat.

E is a shaft extending transversely of the frame and having bearings in the rear ends of the side bars and reach-bar. The shaft ends, which extend beyond the side bars, are each equipped with a head $f$, through which extends a leg $g$, said legs being carried by the axle-stubs E', on which are journaled the rear wheels $E^2$. The legs $g$ are slidable in the heads $f$, whereby to closely adjust the height of the rear end of the frame for regulating the depth of the drill, the adjustment being maintained by tightening a set-nut $f'$. Further adjustment of the frame is also effected by movement of a hand-lever $d$, clamped at its inner end to the shaft E, whereby movement of the lever swings the wheels $E^2$ longitudinally of the frame, the different steps of adjustment being maintained by a hand-released spring-pressed locking device on the lever engaging a toothed segment $d'$, carried by the cross-bar $A^3$. Extended movement of the lever, as shown in Figs. 1 and 2, throws the machine out of gear by elevating the drill-shoes above the surface of the ground.

The reach-bar $A^4$ at its forward end is formed to provide a substantially rectangular vertically-disposed frame having guide-openings for a slidable king-post X, to the lower end of which the truck $E^3$ of the front wheels $E^4 E^4$ is pivoted. The front axle-tree $c$ is provided at its ends with apertured heads $c'$, which slidably receive legs F on the front axle-stubs. The forward portion of the frame A is therefore vertically adjustable in a manner similar to the manner of adjustment of the rearward portion of the frame, the adjustment being maintained by set-nuts, as shown. Secured to the king-post above and below its pivotal connection with the truck $E^3$ are arms B B, to the joined ends of which is hinged a brace-bar B', having at its outer end a loop $B^2$, which is slidable along the reach-bar $A^4$. The forward portion of the frame A is vertically movable to throw the machine into and out of gear, and when in elevated position the bar B' serves to brace the extended king-post and relieve it from strain, the loop $B^2$ in the stated position of the parts shouldering against a projection $B^3$ on the reach-bar.

The forward portion of the frame A is raised and lowered relatively to the truck by a lever V, pivoted to a bracket secured in the frame of the reach-bar and provided at its end with a toothed segment W, which engages teeth on the king-post X. The free end of the lever is within convenient reach of the operator, and by raising the lever the forward end of the frame A is elevated, whereas by depressing the lever this frame portion is lowered to throw the machine into gear. The frame is locked in elevated position by a spring-pressed bolt Q, which enters a recess in the king-post when the recess and bolt are coincident. The king-post is released and the frame allowed to fall by the withdrawal of the bolt against the action of its spring, this being accomplished by pressing downwardly on a foot-lever Q', which is connected with the bolt by a rod $Q^2$. To throw the machine into or out of gear, the frame is first unlocked by depressing the foot-lever Q', after which the levers $d$ and V are swung in the directions which will effect the raising or lowering of the frame, dependent upon which is desired. The depth of entry of the drills is regulated, as before stated, by means of the adjustable connection of the frame with the forward and rear trucks, and, if desired, adjustment of the rear portion of the machine may be accomplished through the medium of the lever $d$ and segment $d'$.

The draft-hound $h$ is connected rigidly with the axle-tree $c$; but the tongue D is pivotally connected with the axle-tree, whereby the tongue is free from all weight of the machine, and the necks of the horses are relieved of this weight, the tongue serving merely to guide the machine.

The drills are each composed of two tube-sections $l\ l'$, joined by flexible tubing $n$ and a shoe $p$. The lower sections are supported to be adjusted laterally to regulate the distance between rows, each section carrying a sleeve $u$, which is slidable on a shaft $k$, the position of the drill being maintained by a set-nut $u'$, which is inserted into one of a number of threaded holes $u^3$ in the shaft through a slot $u^2$ in the sleeve. Preferably three rows of drills are employed mounted in staggered relation to each other on three shafts $k\ k'\ k^2$, but arranged to permit the machine to readily pass weeds, stalks, and rubbish without danger of clogging the drills. It will be understood that the drills are readily adjustable laterally to provide for increased or decreased distances between rows, the shafts being provided with properly-spaced holes $u^3$ for the purpose. The lower drill-sections $l'$ are braced by rods $q$, which are secured at one end to the frame and at the other end by wooden pins $t$ with the drill-section. If a drill meets an obstruction which would otherwise cause injury thereto in passing, the pin $t$ will break and allow the drill-section to move rearwardly, the slot $u^2$ permitting such movement.

S S denote press wheels or rollers mounted in pairs on the end of an arm S', pivoted by means of a sleeve $s$ to the shaft $k$. Pivoted to the arm is a rod $s'$, which is guided in an opening in the frame-bar $A^3$. On this rod is coiled a spring $s^2$, which operates to press the wheels downwardly. The wheels are adjusted along the shaft to coincide with the adjustment of the drills, and the supporting rear wheels $E^2$ are provided with long and short hub projections, whereby each wheel may be reversed in position on the axle-stub to aline with the outer drills. The hopper-box Z is equipped with any suitable feed device operated by sprocket means, including a gear M on the feed-shaft and a pinion L on one wheel $E^2$. The gear and pinion have each long and short hub projections, whereby they may be reversed to preserve alinement when the wheel $E^2$ is reversed. The shoes $p$ may be provided with suitable means for scattering the grain at its discharges.

The machine may be converted into a cultivator by removing the hopper-box and press-rollers and by disconnecting the third and fourth drills at each side of the center drill on shaft $k$. It will be understood that the center drill and center press wheel or roller are immovable along the shaft.

The lister corn attachment (shown in Fig. 3 and in dotted lines in Figs. 1 and 2) consists of a shoe N, at the rear end of which are mounted disks N' N', the shoe carrying a socketed part $n$, in the ends of which are adjustably inserted crank-axles $n'$, which when turned and held by a set-nut $n^2$ regulates the depth of cut of the disks. At the forward end of the shoe is an arm $n^3$, and $n^4$ is a rod adjustable as to length and pivoted at its lower end to the inner end of the arm $n^3$. A spring $n^5$ connects the arm and rod to press the free end of the shoe and the disks into the ground. The rod in practice is inserted in a sleeve $z$, fastened on the frame-bar A', and the rear end of the shoe is connected by chains $n^6$ to the frame at $y$. It will be understood that the disks are adjusted to follow the trenches on listed corn and are caused to enter the ground by the action of the spring $n^5$. When the attachments are in place, the machine is converted into a two-row corn-cultivator, the disks operating to clean the sides of the trenches and the shoe-runners serving to cultivate the ground between the rows.

With the hopper-box and rollers detached the machine may be effectively employed to pulverize stubble-ground.

I claim as my invention—

1. In a machine of the class described, a frame, a truck supporting the frame, means for raising and lowering the frame with reference to the truck, and wheels vertically adjustable on the truck.

2. In a machine of the class described, a frame, a truck supporting one end of the frame, means for raising and lowering the frame with reference to the truck, wheels vertically adjustable on the truck, wheels supporting the other end of the frame, means for raising and lowering said other end of the frame and means effecting the vertical adjustment of said last-named wheels.

3. In a machine of the class described, a frame supported at each end upon wheels, means for raising and lowering the frame including a lever, and locking means for the elevated frame including a foot-lever.

4. In a machine of the class described, a frame adjustably supported at its ends on wheels, means for raising and lowering one end of the frame including a lever, means for raising and lowering the other end of the frame including a lever, and spring-pressed locking means for the elevated frame including a releasing foot-lever.

5. In a machine of the class described, a frame carrying a plurality of transverse shafts, drill-tubes arranged in staggered relation to each other and directly attached to the shafts to have lateral adjustment and a rearward movement, a brace for each drill-tube, a transverse shaft on the frame at the rear of the aforesaid shafts, spring-pressed rollers mounted on the rear shaft to be adjusted laterally, and reversible supporting-wheels for the frame each having long and short hub portions.

In testimony whereof I have signed my name to this specification in the presence of two subscribing witnesses.

Dated March 7, 1902.

LAWRENCE SACK.

In presence of—
FRANK J. TAYLOR,
JOSEPH SACK.